July 26, 1966  R. P. GRANADA ET AL  3,262,463

PNEUMATIC TRANSMITTER WITH IMPROVED CONTROL MECHANISM

Filed Sept. 4, 1962  4 Sheets-Sheet 1

INVENTORS
RICHARD P. GRANADA
VICTOR N. LAWFORD
BY Fulwider, Patton, Rieber
Lee, and Utecht
Attorneys

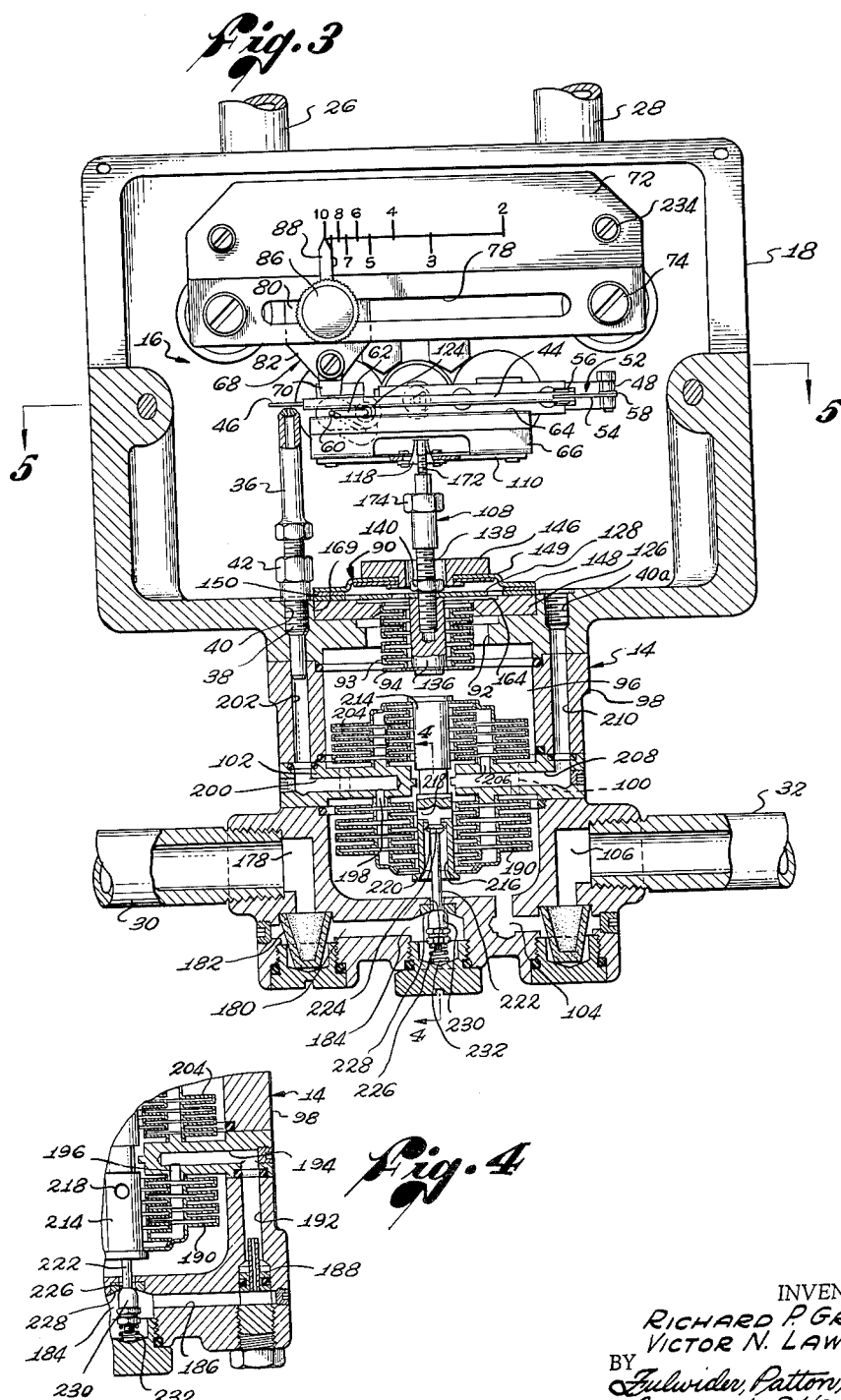

July 26, 1966  R. P. GRANADA ET AL  3,262,463

PNEUMATIC TRANSMITTER WITH IMPROVED CONTROL MECHANISM

Filed Sept. 4, 1962  4 Sheets-Sheet 3

INVENTORS
RICHARD P. GRANADA
VICTOR N. LAWFORD
BY Fulwider, Patton, Rieber,
Lee, and Utecht
Attorneys July 26, 1966 R. P. GRANADA ET AL 3,262,463
PNEUMATIC TRANSMITTER WITH IMPROVED CONTROL MECHANISM
Filed Sept. 4, 1962 4 Sheets-Sheet 4
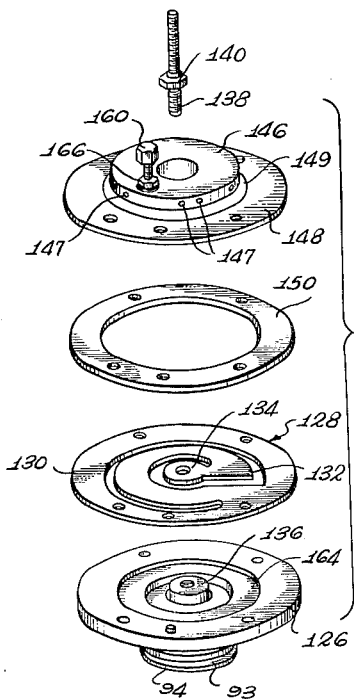
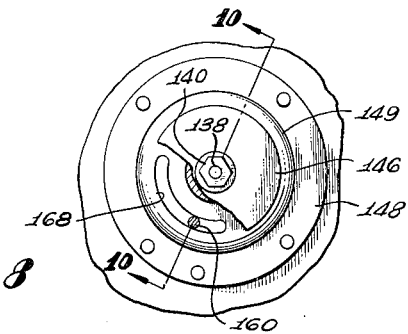
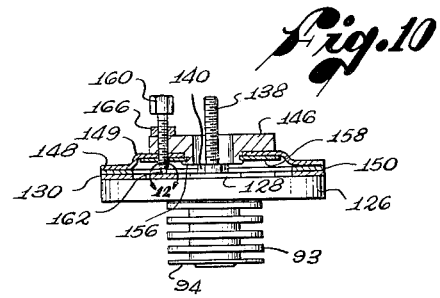
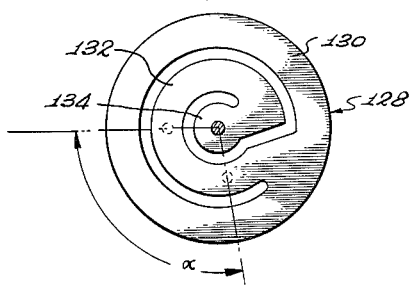
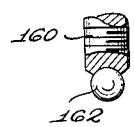
INVENTORS
RICHARD P. GRANADA
VICTOR N. LAWFORD
BY Fulwider, Patton, Rieber,
Lee, and Utecht
Attorneys

United States Patent Office 3,262,463
Patented July 26, 1966

3,262,463
PNEUMATIC TRANSMITTER WITH IMPROVED
CONTROL MECHANISM
Richard F. Granada, West Covina, and Victor N. Lawford, Pasadena, Calif., assignors, by mesne assignments, to International Telephone and Telegraph Corporation, New York, N.Y., a corporation of Maryland
Filed Sept. 4, 1962, Ser. No. 221,664
6 Claims. (Cl. 137—85)

This invention relates to pneumatic transmitters, and more specifically to improvements in control mechanisms for pneumatic transmitters of the type disclosed in U.S. Patent No. 2,842,148 entitled, Motion Transmitting Mechanisms for Air Transmitters, and No. 2,912,993 entitled, Motion Transmitting Mechanism for Air Transmitter.

In general, such a transmitter senses a variable, such as differential fluid pressure existing at a primary device, and transmits a pneumatic signal proportional thereto to a remote location. This is achieved in the case of the devices disclosed in the two noted patents by providing a differential pressure unit (d.p.u.) with fluid connections to the primary device. A highly satisfactory d.p.u. for this purpose is that disclosed in U.S. Patent No. 2,400,048 entitled, Differential Pressure Responsive Device, and No. 2,664,749 entitled, Fluid Pressure Responsive Equipment. Such a d.p.u. commonly includes a bellows assembly embodying a pair of fluid filled bellows to which the different pressures are applied. The pressure differential causes the bellows to move a proportional distance, and their movement is mechanically transmitted by a torque tube assembly to rotational movement of an output shaft.

A transmitter of this type further includes an air relay which functions to modulate the pressure of compressed air from a suitable regulated source. This air is transmitted as a pressure signal to a receiver which may be at a remote location, the pressure of this transmitted signal being referred to herein as "transmitted pressure." A relay which is particularly advantageous in performing this function is disclosed in U.S. Patent No. 2,838,067 entitled Air Relay. This relay embodies a pair of bellows, both of which are subjected to the transmitted pressure. A pilot pressure conducted to one of the bellows functions as an unbalancing or triggering pressure to move both bellows in unison, and thereby operate a valving assembly to modulate the transmitted pressure.

The pilot pressure, in turn, is regulated by a nozzle-flapper assembly. The flapper of this assembly is coupled to the output shaft of the d.p.u. and is moved thereby, while the nozzle is connected to the bellows to which the pilot pressure is applied and serves to permit air to escape at a low rate from those bellows. With this arrangement, the restriction to escape of air from the nozzle is determinative of the pilot pressure. In normal operation, the flapper rocks toward and away from the nozzle responsive to rotation of the output shaft to vary the restriction. When the flapper moves toward the nozzle, the pilot pressure, of course, builds up and causes the transmitted pressure to increase. On the other hand, when the flapper moves away from the nozzle, the pilot pressure rapidly decreases resulting in a decrease in transmitted pressure. Thus, the flapper-nozzle assembly is constructed and arranged so that pilot pressure is varied a slight amount to trigger or unbalance the bellows of the relay upon movement of the ouput shaft of the d.p.u.

Another important feature of transmitters of the subject type is the provision of repositioning bellows on which the flapper is fulcrumed. These bellows are likewise subjected to the transmitted pressure, whereby changes in transmitted pressure bring about corresponding changes in the fulcrum point of the flapper. As a consequence, the transmitter makes use of the negative feedback principle of instrumentation. A closed loop is established, and the transmitted pressure signal is fed back into the system to bring it to a stabilized condition. Thus, the flapper is capable of rapidly assuming a stable position upon movement of the output shaft of the d.p.u. to a given position. Moreover, the flapper is in readiness for instantaneous response to further changes in differential pressure.

For convenience of reference, the nozzle-flapper assembly and the repositioning bellows assembly, including the means for fulcruming the flapper, are broadly referred to as the control mechanism. In view of the foregoing, it will be understood that the purpose of the control mechanism is to operatively couple the d.p.u. to the relay in such a manner that pilot pressure for triggering the relay bears a direct relationship to the output movement of the shaft of the d.p.u.

With the above discussion in mind, attention is now directed to certain desirable features of control mechanisms for pneumatic transmitters. In this regard, it is highly desirable to be able to adjust the range of the instrument so that it transmits its full range transmitted pressure signal over a small portion or percent of the full differential pressure range. By way of example, in a transmitter with a 0–100″ w.c. (water column) differential pressure range and a 3–15 p.s.i. range of transmitted pressure, it may be desirable to obtain the full 3–15 p.s.i. output signal for, say, 40% of the full 0–100″ w.c. differential pressure range, or 0–40″ w.c. The term "adjustable span" is used herein for this characteristic.

Another desirable feature which is related, but different from adjustable span capability, is an adjustment enabling full transmitted pressure range to be obtained over some intermediate differential pressure range of the instrument which is less than the full range. For example, using the figures given above, it may be desirable to obtain a 3–15 p.s.i. transmitted pressure signal over a differential pressure range of 40–80″ w.c. This is termed "adjustable suppression" of the instrument. As will be appreciated, the adjustable span and adjustable suppression capabilities are highly desirable from the standpoint of making an instrument highly flexible and capable of being used in a wide variety of applications.

In conjunction with the repositioning bellows assembly, its bellows are normally biased to a neutral position by a suitable spring or springs. It will be understood that the assembly spring rate or force per unit deflection affects flapper movement and, hence, relay operation. This follows from the fact that the repositioning bellows fulcrum the flapper. To provide for the requisite movement of the bellows responsive to changes in transmitted pressure, it has heretofore been necessary to select springs by trial and error to get those having just the desired characteristics. In such cases, calibration has been difficult, at best. Therefore, it will be appreciated that providing means on the repositioning bellows assembly itself or quick and easy adjustment of the spring rate is a highly desirable feature of such a control mechanism.

It is, therefore, a primary object of this invention to provide a pneumatic transmitter embodying an improved adjustable control mechanism.

A more specific object is to provide an improved control mechanism for a pneumatic transmitter in which the mechanism includes span adjustment means for rendering the instrument capable of transmitting its full range transmitted pressure signal over a range of differential pressure less than the full range.

A related object is to provide a control mechanism of a type described embodying suppression adjustment means enabling the transmitter to transmit its full range transmitted pressure signal over a predetermined range of differential pressure, which is a predetermined intermediate portion of the full range.

It is a further object of this invention to provide an improved control mechanism of the type described for a pneumatic transmitter, the mechanism having further adjustment means associated with the span and suppression adjustment means for compensating non-linearity in the various bellows of the transmitter.

Another object of this invention is to provide an improved control mechanism of the type described, characterized in that it incorporates an improved repositioning bellows assembly in which the spring rate or force per unit deflection of the bellows may be quickly and easily adjusted without changing the position of the movable end of the bellows.

A related object of this invention is to provide such a bellows assembly having means for preloading the bellows and thereby adjustably establishing the magnitude of force required to move the bellows.

It is a still further object of this invention to provide a pneumatic transmitter embodying an improved control mechanism, which is capable of accomplishing all of the foregoing objects, yet which is relatively simple in construction and troublefree in operation.

It is another object to provide for a pneumatic transmitter control a spring assembly, in which the spring rate is adapted to be conveniently adjusted without changing the position of the load-bearing parts of the spring.

These and other objects, features, and advantages of the invention will be better understood by referring to the following detailed description taken in conjunction with the accompanying drawings, in which;

FIGURE 3 is a vertical section taken along the line 3—3 of FIGURE 2, the parts of the control mechanism being shown in the same adjusted and operative positions as in FIGURE 2;

FIGURE 4 is a partial section taken along the line 4—4 of FIGURE 3;

FIGURE 8 is an exploded view of the improved repositioning bellows assembly of the invention;

FIGURE 9 is a top plan view of the repositioning bellows assembly with certain portions being partially broken away and removed to show the detailed construction of underlying parts;

FIGURE 10 is a vertical section of the repositioning bellows assembly in which certain parts are shown in elevation;

FIGURE 11 is a diagrammatic plan view of a portion of the reopsitioning bellows assembly, showing the angular adjustment range of the adjustment means for varying the spring rate of the repositioning bellows assembly; and FIGURE 12 is a partial sectional view on an enlarged scale of the area encircled by the line 12 in FIGURE 10.

Figure 1:
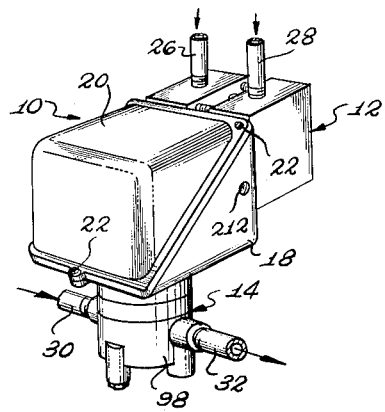
FIGURE 1 is a perspective view on a reduced scale of a pneumatic transmitter constructed in accordance with the invention, the transmitter being shown as connected for operation in a suitable conduit system.
Figure 2:
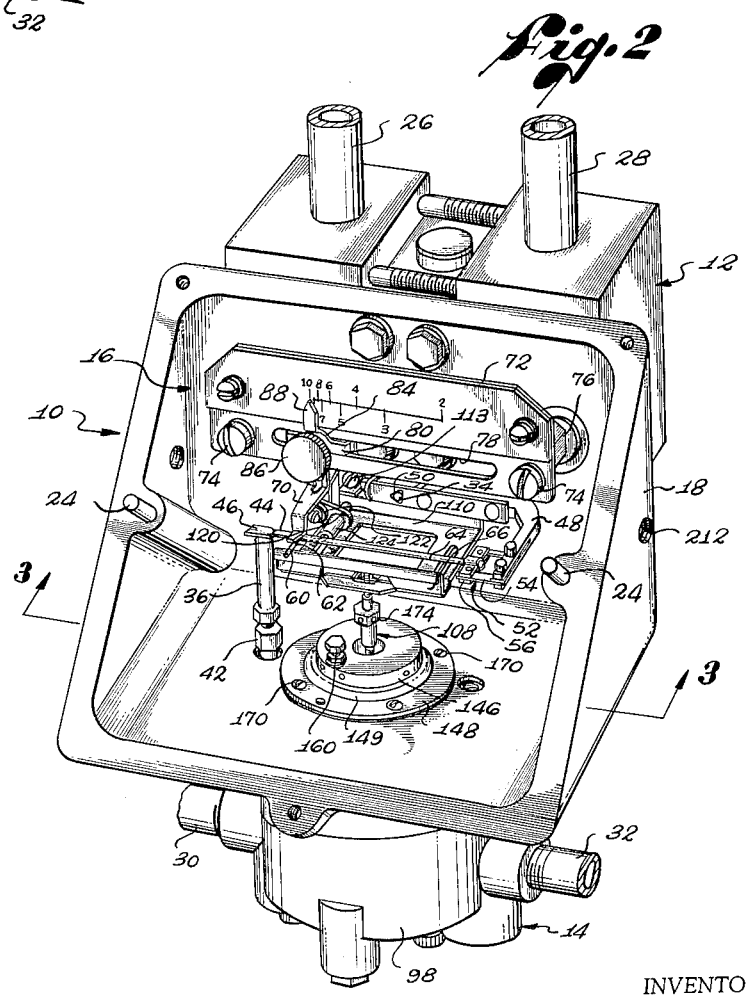
FIGURE 2 is a perspective view similar to FIGURE 1, showing the transmitter with its cover removed to display the major portion of the improved control mechanism, the mechanism being shown adjusted to produce its full range transmitted pressure signal for full range differential pressure and with the various parts in the positions occupied when zero differential pressure exists.

Referring to the drawings, and in particular to FIGURE 2 thereof, the numeral 10 designates generally the transmitter of the invention. It includes a sensing unit or actuating device which may typically comprise a differential pressure unit 12, an air relay 14, and a control mechanism 16. A case 18 having a bottom and rear wall and triangularly shaped side walls is provided for housing the various parts of the control mechanism 16, as well as for mounting the d.p.u. 12 and the relay 14. In order to enclose the mechanism 16 when the transmitter is in use, the case 18 has a cover 20 removably secured to it, as by screws 22, in the manner illustrated in FIGURE 1. Centering pins 24 project from the top surface of the case 18 to facilitate proper placement of the cover on the case.

When the transmitter is connected for use, conduits 26 and 28 lead from the d.p.u. 12 to the high and low pressure sides respectively of a primary device (not shown) which may comprise orifice plates, venturis or the like. Leading from the relay 14 are respective input and output conduits 30, 32 for connection to a regulated supply of compressed air and to a suitable receiver (not shown), which may be at a remote location. Typically, the receiver comprises a gauge, a control device, recorder or the like.

It will be recalled from the introductory discussion that the function of the transmitter is to sense a variable, such as differential pressure existing at the primary device, and transmit a pneumatic signal proportional to the variable to the receiver. During operation of the transmitter 10, the control mechanism 16 functions in the illustrative embodiment to vary a pilot pressure in accordance with the mechanical output of the d.p.u. 12, and the pilot pressure, in turn, triggers operation of the relay 14.

Figure 5:
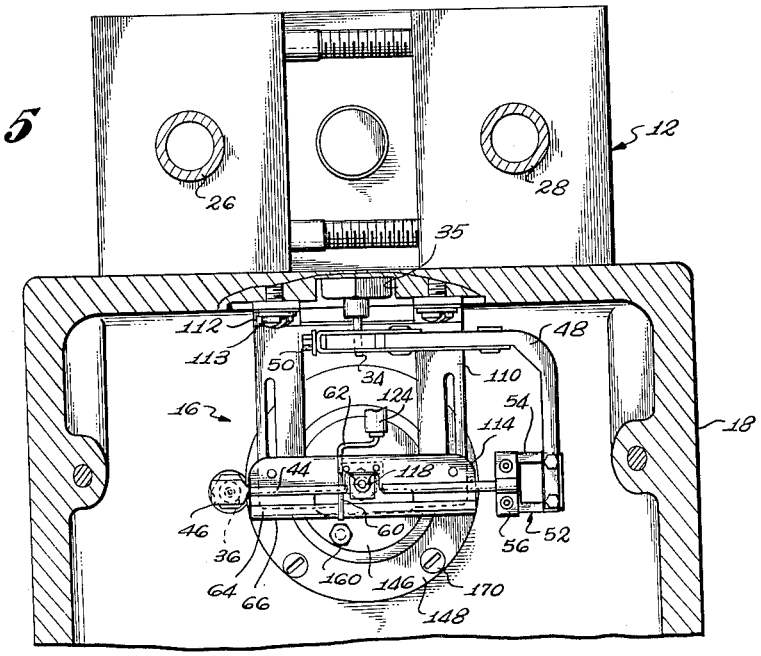
FIGURE 5 is a partial section taken along the line 5—5 of FIGURE 3 with certain parts of the control mechanism being broken away and removed to show underlying parts more clearly.

The sensing unit provides an output movement that is related to a measured variable. In the case of the illustrative d.p.u. 12, this is a rotational movement of an output member to a position corresponding to the magnitude of the variable. As best seen in FIGURE 5, the d.p.u. 12 has an output shaft 34 that projects through a bore 35 in the rear wall of the case 18 for operative connection to the control mechanism 16. The d.p.u. 12 is constructed and arranged so that the output shaft 34 turns in one direction through a predetermined angle for the full range of differential pressure, e.g., 0°–8° counterclockwise throughout a range of 0–100″ w.c.

Referring to FIGURES 2 and 3, the control mechanism 16 includes a nozzle 36 which is fluid connected to the relay 14. The nozzle 36 is secured in a vertical position, as by threading its lower end 38 into a correspondingly threaded bore 40 in the bottom wall of the case 18. Vertical adjustment of the nozzle 36 is achieved by simply varying the extent to which it is threadedly engaged in its bore 40. Locking of the nozzle in adjusted position is effected by means of the lock nut 42 thereon, which is adapted to be screwed down into engagement with the bottom wall of the case 18.

Operatively associated with the nozzle 36 at its upper end is a flapper 44, which functions to vary the restriction to air passage or escape from the nozzle. The flapper 44 comprises an elongated, straight member having proximal and distal ends and initially positioned generally horizontally. Its distal end is formed with a flat plate 46 disposed in covering relationship with the nozzle 36. Variable restriction of the nozzle 36 is brought about by rocking the flapper 44 slightly with respect to the horizontal to move the plate 46 on its distal end toward and away from the nozzle.

Figure 6:
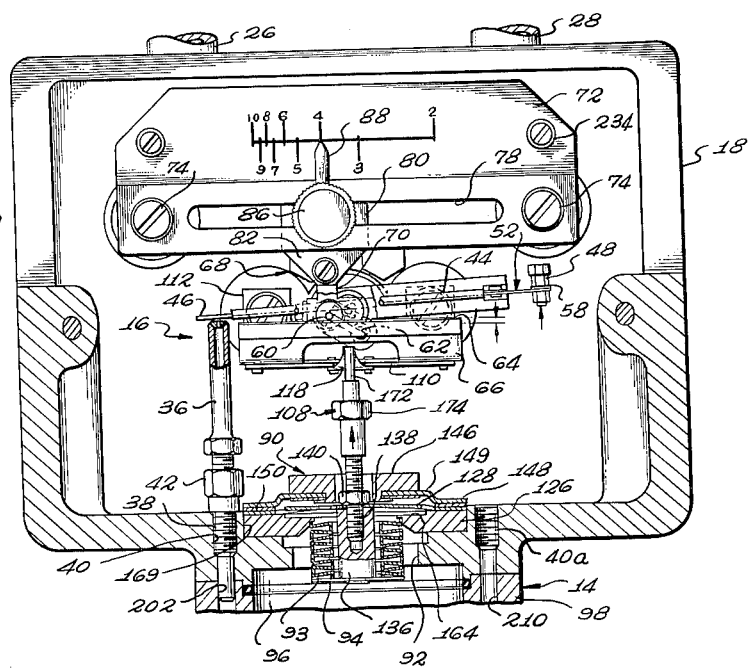
FIGURE 6 is a partial vertical section similar to FIGURE 3, except that the control mechanism is shown adjusted so that less than the full range differential pressure produces full range transmitting pressure signal and in a condition wherein a differential pressure is being sensed.

In the embodiment shown, the flapper 44 is arranged perpendicular to, and is coupled to, the output shaft 34 of the d.p.u. 12 by a linkage including an L-shaped arm 48. The arm 48 is releasably secured to the shaft 34, as by a releasable clamp assembly 50 (see FIGURES 2 and 5). At its opposite end, the arm 48 is joined through a hinge 52 to the proximal end of the flapper 44. The hinge 52 comprises a pair of substantially horizontal light flexures 54 oriented approximately parallel to and spaced on opposite sides of the axis of the flapper 44. The flexures 54 at one end are secured to a bracket 56 to which the proximal end of the flapper 44 is also secured, and at their opposite ends the flexures 54 are clamped in a slot 58 in the end of the arm 48. By virtue of this arrangement, the flapper 44 rocks with the arm 48 responsive to rotation of the output shaft 34. Since the shaft 34 moves counterclockwise from its zero position of FIGURES 2 and 3, the flapper 44 rocks downwardly at its distal end during shaft rotation, as illustrated in FIGURE 6. The function of the hinge 52 is to carry the flapper 44 with the arm 48 during such rotation, and also permit the flapper to pivot or rock slightly with respect to the arm 48 without frictional restraint.

During rocking movement of the flapper 44, it is fulcrumed on the forwardly projecting end 60 of an idler crank 62. The fulcrum end 60 slidably engages the upper horizontal edge 64 of a fulcrum support bar 66. The idler crank 62, in turn, is supported by a carriage 68 mounted for transverse movement relative to the case 18 along a line substantially parallel to the guide edge 64. Also supported by the carriage 68 is a spring finger 70 that bears against the upper edge of the flapper 44 and constantly maintains it in engagement with the end 60 of the crank 62. Thus, it will be seen that transverse movement of the carriage 68 serves to change the fulcrum point of the flapper 44. Accordingly, in different positions of the carriage 68, a given rotational movement of the output shaft 34 produces a different movement of the distal end of the flapper 44. As will become apparent, this is a unique arrangement for achieving span adjustment.

In order to mount the carriage 68 for such transverse movement, a mounting plate 72 is provided which is supported parallel to and spaced forwardly of the rear wall of the case 18, as by bolts 74 and spacers 76. A horizontal slot 78 adjacent the lower edge of the plate 72 slidably receives a key 80 on the carriage 68 and serves to guide its movement. To retain the carriage 68 in assembly with the plate 72 and also to lock it in adjusted position, the carriage has a back-up plate 82 fixed to the key 80 that rides along the rear side of the plate 72, and a retainer flange 84 on the key 80 that rides along the front side. A lock nut 86 extends through the key 80 and is threadedly engaged in the back-up plate 82 for releasably clamping the parts together.

Span adjustment of the instrument is carried out by simply loosening the lock nut 86 and sliding the carriage 68 along the plate 72 within the limits of the slot 78. As previously explained, the carriage 68 moves with it the idler crank 62, so that the fulcrum point of the flapper 44 is changed. As a result, a given movement of the output shaft 34 of the d.p.u. 12 produces a correspondingly different movement of the distal end of the flapper 44. To aid the user in making span adjustments, a pointer 88 projects upwardly from the retainer flange 84 on the front side of the mounting plate 72 and is adapted to be aligned with index marks on the plate 72, which preferably are identified by appropriate numerals.

To further aid in understanding the foregoing, index marks are shown bearing numerals "10," "9," "8," . . . "2," extending from left to right, which represent "percent of differential pressure $\times 10$." With the carriage positioned so that the pointer 88 is aligned at "10," as in FIGURES 2 and 3, the full differential pressure range of the unit 12 is correlated with the full signal range of the relay 14. Should the carriage be moved to align the pointer 88 with the index mark "4," as in FIGURE 5, 40% of the full differential pressure range of the unit 12 then produces full signal range of the relay 14. This follows from the fact that at "4" the fulcrum end 60 of the idler crank 62 has been positioned to increase the spacing between it and the nozzle 36, i.e. compared to the spacing with the pointer at "10." Accordingly, a given rotation of the output shaft 34 of the d.p.u. 12 produces a correspondingly greater movement of the distal end of the flapper 44.

The fulcrum support bar 66 is supported for limited vertical movement by a repositioning bellows assembly 90. To this end (see FIGURE 3), the bellows assembly 90 is received in a bore 92 in the bottom wall of the case 18. The assembly 90 includes a bellows 93, which extends into the upper end of the housing of the relay 14. The bellows 93 is internally open to the atmosphere and having a movable end 94, which extends down through the bore 92 into a chamber 96 defined by the relay housing 98. The upper end of the bellows 93 is stationary. The interior of the chamber 96 is in fluid communication with the output conduit 32 of the relay, as through openings 100 through a horizontal plate 102 dividing the chamber into two parts, and through communicating outlet passages 104 and 106 in the lower end of the housing of the relay 14. Accordingly, the bellows 93 is subjected externally to transmitted pressure, so that its lower end 94 undergoes vertical movement to positions corresponding to the transmitted pressure.

The movable end 94 of the bellows 93 is connected to the fulcrum support bar 66 through a shaft assembly 108 and follower plate 110. The upper end of the shaft assembly engages the follower plate 110, which is secured to the fulcrum support bar 66. Thus, the movements of the inner end 94 of the bellows 93 are transmitted through the shaft assembly 108 to the fulcrum support bar 66, whereby the fulcrum support bar 66 is movable in response to changes in the transmitted pressure.

The purpose of the follower plate 110 is to stabilize the fulcrum support bar 66 and aid it in supporting it. In order that it enables the bar 66 to move freely under the influence of the bellows 93 and yet perform its intended functions, the follower plate 110 is connected to the rear wall of the case 18 by a pair of flexures 112 which are secured to the wall, as by screws 113 (see FIGURE 5). Adjacent its forward edge, the plate 110 is suitably secured to a horizontal mounting flange 114 on the lower edge of the fulcrum support bar 66. Connection of the plate 110 to the upper end of the shaft assembly 108 is shown by way of a generally conically shaped bracket 118 fixed to the two parts.

With this operative connection between the bellows assembly 90 and the fulcrum support bar 66 in mind, it will be understood that the result of bellows movement is to raise and lower the fulcrum end 60 of the idler crank 62 and, hence, the fulcrum point of the flapper 44, responsive to changes in transmitted pressure. As shown in FIGURE 6, the idler crank 62 is mounted on the carriage 68 by a bracket 120 secured to the back-up plate 82 by a screw 122. A sleeve 124 projects for pivotal movement in such a manner that friction is minimized. As the horizontal guide edge 64 of the fulcrum support bar 66 moves up and down, the projecting fulcrum end 60 of the crank rides in engagement with the surface, since the pivotal axis of the crank is spaced transversely from the end portion.

The effect of such fulcrum support bar movement is to rock or pivot the flapper 44 slightly with respect to its drive arm 48, and move the flat distal end plate 46 of the flapper 44 toward and away from the nozzle 36. Thus, flapper position is a function of transmitted pressure. Moreover, the flapper is rapidly stabilized in a position corresponding to any given position of the output shaft 34 of the unit 12. In this stabilized condition, it is capable of responding substantially instantaneously to subsequent rotation of the output shaft 34 brought about by changes in differential pressure.

Heretofore, problems have been encountered in attempts to compensate for non-linear actions of the various bellows of a pneumatic transmitter. To compensate for this non-linearity in the present invention, it is simply necessary to adjust the position of the pivotal axis of the idler crank 62. This adjustment can be quickly and easily made by loosening the lock screw 122, rotating the bracket 120 to the proper position and locking it in that position. To explain this function, it is to be noted that there is no compensation when the crank pivot is initially positioned substantially in horizontal alignment with the guide edge 64 of the fulcrum support bar 66, as in FIGURES 2 and 3. In this position, the fulcrum end 60 of the crank maintains essentially the same lateral position, i.e. does not slide along the guide edge 64 as the bar 66 moves vertically. This result obtains in practice because the vertical movement of the fulcrum support bar 66 is of the order of only 0.020" for full range operation. For such small movements, the fulcrum end 60 essentially travels only along a vertical line. Accordingly, the movement of the fulcrum is essentially linear and is not effective to alter pivotal movement of the flapper which reflects non-linear bellows action.

Figure 7:
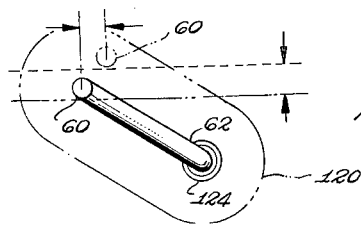
FIGURE 7 is a diagrammatic view on an enlarged scale of the linear adjustment means of the control mechanism, illustrating the operation of the same when adjusted to the portion of FIGURE 6 and as the parts move from a zero differential pressure condition to the condition of FIGURE 6 where a differential pressure is being sensed.

However, compensation does take place when the crank 62 is initially positioned with its pivot axis either above or below the guide edge 64. For example, assume the crank pivot axis is initially fixed below the guide edge 64, as shown in FIGURE 6 (and in phantom lines in FIGURE 3). Referring also to FIGURE 7, it will be seen that this is a condition in which any upward movement of the fulcrum end 60 causes it to move along a line or portion of an arc, that is at an angle to the vertical. Hence, even for movements less than 0.020", the fulcrum moves laterally as well as vertically. Accordingly, the pivotal movement of the flapper is not the same in different vertical positions of the guide edge 64, and hence is non-linear. By this introducing non-linearity into the pivotal movement of the flapper the effects of non-linear bellows action are compensated. Thus, as the bar 66 is moved upwardly due to increased transmitted pressure acting on the repositioning bellows 93, movement of the distal end of the flapper 44 away from the nozzle 36 is at a progressively increasing rate. Hence, positioning the crank 62 with its pivot axis below the horizontal guide edge 64 for appropriate clockwise rotation of the bracket 120, serves to compensate a high reading of transmitted pressure. It is to be understood that in conjunction with such adjustment, calibration is necessary to correlate the maximum transmitted pressure signal of the relay 14 with the maximum differential pressure reading.

Conversely, a low transmitted pressure at a given intermediate differential pressure reading is compensated by counterclockwise positioning of the mounting bracket 120. Thus, it will be appreciated that there is provided highly effective means for quickly and easily compensating error introduced into the system by reason of non-linear bellows action.

The detailed construction of the repositioning bellows assembly 90 is illustrated in FIGURES 8 through 12. An annular support 126 adapted to be secured to the case 18 serves to mount the various parts of the assembly. The bellows 93 has its upper end secured to the inner periphery of the support 126 and its movable end 94 projecting downwardly from the lower surface and adapted for movement toward and away therefrom.

Movement of the lower end 94 of bellows 93 toward the lower surface of the support 126 is yieldably resisted by a disk spring 128. As best shown in FIGURES 2, 8, and 10, the spring 128 comprises a peripheral mounting ring 130 secured to the upper surface of the support 126, and a load member 132 that curves or spirals inwardly from the inner periphery of the ring 130 toward its center. The load member 132 terminates in a central mounting ring 134 adapted to be connected to the movable end 94 of the bellows. For such connection, a stem 136 is provided in the bellows 93 and has its lower end secured to the lower end 94 of the bellows. The stem 136 extends past the upper end of the bellows and is internally threaded to receive a threaded rod 138 which extends through the mounting ring 134. The rod 138 has a flange 140 fixed to it at about its midpoint so that the rod can be threaded into the stem 136 until the flange 140 abuts the ring 134 and clamps it between the flange 140 and the stem 136.

The effective length of the spring 128 in its unrestrained condition is the distance along the curved load member 132 from the central mounting ring 134 out to the mounting ring 130. As is apparent, changing the effective length of a spring changes its rate or force per unit deflection.

It is advantageous to be able to vary the spring rate of the spring 128, so as to enable the user to adjustably control the bellows action. To this end, adjustment means are provided which include an annular collar 146, at one end of which is a mounting flange 148 adapted to be secured to the upper surface of the support 126, the flange and the support 126 being separated by a spacer ring 150. The flange 148 (see FIGURE 10) is clamped to the collar 146 in a manner to permit angular movement of the collar 146 relative to the flange 148 under frictional restraint.

In this connection, the collar 146 seats on the top side of a central bulged portion 149 of the flange 146, and has a crown 156 that is pressed over against a washer 158 on the bottom side to clamp the central portion 149 therebetween. This clamping action not only maintains the collar 146 in assembly with the flange 148, but also frictionally restrains it against movement. To facilitate angular adjustment of the collar 146 with respect to the flange 148, the collar is provided with a plurality of radial bores 147 in its peripheral edge (see FIGURE 8) that are adapted to receive an appropriate tool. With the flange 148 held stationary, the collar can be turned by a force applied with such a tool that is great enough to overcome the frictional restraint.

Supported by the collar 146 and adapted to pressurally engage the load member 132 of the spring for the purpose of varying its effective length is an adjustment screw 160. On the lower end of the screw 160, a ball 162 (FIGURE 12) is provided for bearing against the load member 132 in the manner illustrated in FIGURES 9 and 10. With the ball 162 positioned in positive engagement with the load member 132, that portion of the member from the point of bearing outwardly to the mounting ring 130 is ineffective in yieldably resisting bellows movement. In other words, the effective length of the spring is the distance along the curved load member from the central ring 134 to the point of bearing, with that length being progressively shortened as the collar is rotated clockwise in FIGURES 9 and 11.

The screw 160 is made vertically adjustable in the collar 146 to insure that the ball 162 is in positive engagement with the load member 132, and also to preload the spring 128. In this latter regard, it may be seen in FIGURE 8 that an annular recess 164 is provided in the upper surface of the support 126 to receive the load member 132, as it is depressed slightly during such preloading from its normal flat condition. Locking of the adjustment screw 160 in adjusted position on the collar 146 is effected by a lock nut 166 threaded on the adjusting screw 160.

The adjustment range of the collar 146 in the present case is limited by the angular extent of a slot 168 (FIGURE 9) in the central portion 149 of the mounting flange 148 through which the adjustment screw 160 extends.

As shown diagrammatically in FIGURE 11, the adjustment angle α is approximately 100° in the present case. However, it is apparent that this adjustment range may be made greater or less, as desired, it being necessary only to make the slot 168 of the desired length and to insure that the ball 162 be aligned over the load member 132 for engaging it when the adjustment screw 160 is turned down. A highly advantageous feature of the spring adjustment means is that the spring rate may be altered without changing the initial position of the movable end 94 of the bellows 93.

To mount the bellows assembly 90 on the case 18, a counterbore 169 concentric with the bore 92 is sunk in the bottom wall. As shown in FIGURES 3 and 6, the support 126 is received in the counterbore 169 with the bellows 93 extending down into the chamber 96 through the bore 92. A plurality of screws 170 (FIGURE 1) extend through the mounting flange 148, the spacer ring 150, and the support 126, and are threaded into bores (not shown) in the case. The screws 170 serve the dual purpose of holding the various parts of the bellows assembly 90 together and of attaching the assembly to the case 18.

The shaft assembly 108, which rigidly connects the bellows 93 to the follower plate 110, includes an upper screw shaft 172 fixed to the plate in the manner previously described, and an adjustment nut 174. When the assembly 90 is properly installed, the shaft 172 is axially aligned with the upwardly projecting end portion of the screw 138 on the assembly. The nut 174 is arranged to receive the two members at its opposite ends, and affords means for conveniently adjusting the vertical spacing between the movable end 94 of the bellows 93 and the horizontal guide edge 64 of the fulcrum support bar 66.

Before considering the operation of the transmitter, the construction and the mode of operation of the relay 14 will be examined. A relay of this type is disclosed in U.S. Patent No. 2,838,067. Referring to FIGURE 3 and 4, it will be seen that compressed air from the conduit 30 enters the relay 14 through passages, 178, 180, passing through a removable filter 182 at the junction of the passages 178, 180 to a chamber 184. As shown in FIGURE 4, a portion of this compressed air flows from the chamber 184 through a radially extending passage 186 to a restrictor 188. After passing through the restrictor, where its pressure is reduced, this air enters the interior of a set of dual bellows 190 attached to the lower surface of the divider plate 102 through a series of communicating passages 192, 194, and 196.

The interior of the lower bellows 190, in turn, is fluid-connected to the nozzle 36 through passages 198, 200, 202. Air from the bellows is thus bled through the nozzle 36 at a rate depending upon the action of the flapper 44. In other words, pilot or back pressure in the lower bellows 190 depends upon the flapper position.

Another set of dual bellows 204 is mounted on the upper side of the divider plate 102, these bellows 204 being substantially identical to the lower bellows 180. The interior of the upper bellows 204 is constantly vented to atmosphere through passages 206, 208, 210. When the cover 20 of the case 18 is in place, escape or entry of air from the case is effected through vent holes 212 (FIGURE 1) in its side wall.

As previously explained, both upper and lower bellows 204, 190 are externally subjected to transmitted pressure existing within the chamber 96. The upper and lower portions of the chamber 96 are in constant communication with one another through the vertical passages 100 in the divider plate 102. In addition, the chamber 96 is open to the outlet conduit 32 through passages 104 and 106.

To provide for movement of the bellow 190, 204 in unison, a rigid stem 214 is connected between their movable ends. An axial bore 216 extends upwardly from the lower end of the stem 214, and at its upper end joins the transverse bore 218. A valve seat 220 is formed in the bore 216 adjacent its junction with the bore 218. A valve member 224 cooperable with the seat 220 is provided on the upper end of a valve stem 222, which is vertically movable relative to the relay housing 98. This member 224 is adapted to engage on the seat 220 to block communication between the bores 216 and 218. When the member 224 is moved off of its seat 220, air from the chamber 96 is allowed to escape to the atmosphere through the path provided by the bores 216, 218 and the passages 208, 210.

The valve stem 222 extends downthrough a bore 226 in the housing 98 which affords a passage between the valve chamber 184 and the chamber 96. A valve seat 228 is provided in the upper wall of the chamber 184 at the opening to the bore 226. Movable toward and away from the seat 228 is a valve member 230 secured to the lower end of the stem 222. The function of this valve member 230 is to throttle the main flow of air from the valve chamber 184 to the chamber 96. A compression spring 232 biases the valve member 230 (and the member 224) toward its seat 228.

In light of this description of the relay construction, it will be understood that the pilot pressure in the lower bellows 190, which is determined by the restriction to the escape of air from the nozzle 36, controls relay operation. As the nozzle restriction is increased from an initial zero differential pressure condition, the pilot pressure builds up in the lower bellows 190, causing the same to expand downwardly, moving with them the upper bellows 204 by virtue of the connecting stem 214. Such downward movement of the stem 214, in turn, moves the valve stem 222 downwardly to force the valve member 230 away from its seat 228. Hence, the throttling of main flow from the valve chamber 184 to the chamber 96 decreases, and the chamber or transmitted pressure increases.

As restriction of the nozzle 36 by the flapper 44 is subsequently decreased, the lower bellows 190 are permitted to contract back toward their neutral position, whereupon both bellows 190, 204 and the connecting stem 214 move back toward their original positions. This action results in the valve member 224 cracking off its seat 220 to bleed off a small quantity of air to the atmosphere and relieve the excess chamber pressure. The relay 14 rapidly reaches a stable condition in which the valve 228, 230 throttles the air flow to the chamber 96 to produce the proper transmitted pressure signal. In retrospect, increased nozzle restriction brings about a corresponding increase in transmitted pressure, whereas decreased restriction results in a decrease in transmitted pressure.

Attention is now directed to the overall operation of the transmitter 10, with particular reference being made to FIGURES 2, 3, and 6. It is first assumed that the instrument is calibrated and that the various elements of the control mechanism 16 are properly positioned for the desired operation. In this connection, the carriage 68 is positioned with the pointer 88 on "10," as in FIGURES 1 and 3, so that the full range of the d.p.u. 12 is correlated with the full transmitted pressure range of the relay 14. To simplify the description, exemplary operating pressures are used, with the ranges being typical of those used in actual practice. To this end, the full range of the d.p.u. 12 is, as indicated above, 0–100″ w.c., and the corresponding angular movement of the output shaft 34 is 0°–8°. Regarding the relay 14, the supply or inlet pressure is 20 p.s.i., with the transmitted pressure being modulated between 3 and 15 p.s.i. in accordance with the differential pressure.

When a zero pressure differential is sensed by the d.p.u. 12, its output shaft 34, of course, remains in its original position. The flapper 44 then occupies approximately the restrictive position illustrated in FIGURE 3, wherein air is permitted to escape constantly at a low rate from the nozzle 36. The repositioning bellows 93 is very slightly compressed, and the valve member 230 is slightly off its seat 228, all in a manner whereby the transmitted pressure equals 3 p.s.i.

Upon a pressure differential of, say 50" w.c. being sensed by the d.p.u. 12, its output shaft 34 rotates 50% of its full travel or 4°. This, in turn, causes the arm 48 to pivot upwardly and the flapper 44 to rock about its fulcrum 60 toward the position shown in FIGURE 6 to further restrict the escape of air from the nozzle 36. As a consequence, the pilot pressure in the passages 199, 200, and 202 and within the lower bellows 190 increases. The bellows 190 are expanded downwardly under the influence of this pilot or triggering pressure, compressing the upper bellows 204, so as to increase the opening between the valve member 230 and its seat 228.

An increase in pressure within the chamber 96 immediately takes place upon such valve opening, causing the repositioning bellows 93 to be compressed in the manner illustrated in FIGURE 6. Bellows compression serves to bring about upward movement of the horizontal guide edge 64 of the fulcrum support bar 66. The flapper 44 is thus pivoted or rocked with respect to the arm 48, and the plate 46 on its distal end is lifted slightly away from the nozzle 36 to reduce the restriction to escape of air. The end result is that a stabilized condition is quickly reached wherein the transmitted pressure is at the midpoint of its range or 9 p.s.i. It will be realized that a signal of this pressure will be transmitted as long as the differential pressure remains constant at 50" w.c.

By way of example, should the differential pressure subsequently decrease to 25" w.c., the output shaft 34 first rotates back 2° from its prior position to a position 2° from its zero position, i.e. 25% of 8°. This causes drive arm 48 to pivot downwardly and the flapper 44 to rock about its fulcrum so that its distal end moves away from the nozzle 36. Pilot pressure is decreased on account of this reduced nozzle restriction, and the lower bellows 190 are permitted to contract back toward their original position. Such bellows movement, in turn, causes the valve 224 to be cracked off its seat 220 to relieve excess chamber pressure to the atmosphere, as well as to permit the valve member 230 to close toward its seat 228 under the influence of the compression spring 232.

Decreasing the transmitted pressure or pressure in the chamber 96, reduces the force applied to the movable end 94 of the repositioning bellows 93, so that the bellows expand downwardly into the chamber. Simultaneously, the guide edge 64 of the fulcrum support bar 66 moves back, as does the fulcrum end 60 of the idler crank 62, and the flapper 44 moves back toward the nozzle 36 to slightly increase restriction. Again a stabilized condition is reached, the transmitted pressure now being 6 p.s.i. As the differential pressure sensed at the primary device subsequently increases or decreases, the operation of the transmitter is the same as described above, with corresponding increases and decreases in the transmitted pressure signal being brought about.

As noted previously, it may be desirable in some applications to adjust the span of the transmitter, so as to obtain full range of transmitted pressure for some small portion or percent of the differential pressure range. In a case, where it is desired to obtain a 3–15 p.s.i. signal for 0–40" w.c. differential pressure, the carriage 68 is simply moved to the position of FIGURE 6, in which the pointer 88 indicates "4." The fulcrum point 60 of the flapper 44 is thereby moved sufficiently so that a given movement of the output shaft 34 produces a correspondingly greater movement of the distal end of the flapper 44. In the case of a transmitter having the operating ranges given, a 40" w.c. differential pressure would, as before, produce a 3.2° rotation of the output shaft 34, but as distinguished from the prior case, a 15 p.s.i. transmitted pressure signal.

In still other applications, it is advantageous to make use of the adjustable supression capability to obtain the full range transmitted pressure signal from the relay 14 for some predetermined intermediate range of differential pressure. By way of example, it might be desired to have a 3–15 p.s.i. transmitted pressure signal for a 40–80" w.c. differential pressure. To accomplish this, the carriage 68 is slid to position the pointer 88 on "4," since 40% of the full differential pressure range is being utilized. Then, in addition to this span adjustment, it is necessary to rotate the adjustment nut 174 of the shaft assembly 108 to raise the guide edge 64 of the fulcrum support bar 66 (and fulcrum point of the flapper 44) with respect to the movable end 94 of the bellows 93 until the minimum or 3 p.s.i. transmitted pressure signal is obtained for the lower or 40" w.c. differential pressure reading. Assuming that no further calibration of the transmitter is necessary, the transmitted pressure signal would now be 15 p.s.i. for an 80" w.c. differential pressure.

In recapitulation, various independent means are provided in the control mechanism 16 for facilitating calibration of the transmitter. In this regard, the nozzle 36, as previously explained, is vertically adjustable to alter its position with respect to the distal end of the flapper 44. Also, the adjustment nut 174 of the shaft assembly 108 may be rotated to raise and lower the relative position of the guide edge 64. These adjustments are normally made to correlate the zero or low differential pressure reading with the minimum transmitted pressure signal. Correlation of the high differential pressure reading with the maximum transmitted pressure signal can be achieved by rotation of the adjustment collar 152 on the bellows assembly 90 to vary the effective length of the spring 128 and, hence, the spring rate in the manner described in detail above.

It will also be recalled that error induced by reason of non-linear action of the various bellows may be effectively compensated by appropriate adjustment of the pivotal axis of the idler crank 62 by adjustment of the bracket 120 supporting the crank. Adjustment of the pivotal axis of the crank 62 to a position above or below the initial horizontal position of the guide edge 64 causes the portion 60 to slide in one direction or the other along the guide edge during its vertical movement to progressively shift the fulcrum point of the flapper 44.

Still another highly advantageous feature of the present transmitter, and one which renders it capable of being used in still other applications, is that it may be arranged for reverse action. That is, it may be arranged to transmit a 15 to 3 p.s.i. pressure signal for its 0–100" differential pressure range. To condition the transmitter for this reverse action, the nozzle 36 is simply removed from its bore 40 and screwed into a like bore 40a which communicates with the passage end portion of the bore 200. In addition, the relay 14 is detached from the case 18 and rotated 180° so that the passage 210 communicates with the bore 40 and the passage 202 with the bore 40a. The drive arm 48 is then released from the output shaft 34 and rotated 180° so that the distal end of the flapper 44 again cooperates with the end of the nozzle 36. Assuming that the instrument is again calibrated, it is now in readiness for such reverse operation. The index marks on the mounting plate do not apply; however, it is a simple matter to replace the portion of the plate carrying the marks by removing the two screws 234.

The pneumatic transmitter of the present invention, with its improved control mechanism, satisfies a long existing need in the art for a rugged and reliable instrument, which is extremely flexible and capable of being used in a wide variety of applications. Besides this great flexibility, the transmitter is accurate and efficient in performing its intended function and is adapted to be quickly and easily calibrated.

While one embodiment of the invention has been illustrated and described in considerable detail, it will be understood that this was only by way of example and that various changes in the details of the constructions and arrangements of the various parts may be made without departing from the spirit and scope of the invention, as reflected in the appended claims.

We claim:
1. In a pneumatic transmitter, the combination of:
a case;
a vertically arranged nozzle mounted on said case;
a flapper having proximal and distal ends and positioned with its distal end in covering relationship with said nozzle to restrict flow therefrom, said flapper being arranged for rocking in a vertical plane to vary the restriction to such flow;
means including a flexure connected to the proximal end of said flapper and arranged to transmit movement thereof under the influence of an externally applied force to such rocking of the flapper;
a carriage adjustably mounted on said case for lateral movement toward and away from said nozzle;
means carried by said carriage and arranged for vertical movement relative thereto for fulcruming said flapper for such rocking;
spring means on said carriage urging said flapper into engagement with said fulcruming means;
and means supported by said case establishing the vertical position of said fulcruming means, said last mentioned positioning means being responsive to changes in transmitted pressure for moving said fulcruming means vertically relative to said case to produce rocking of said flapper.

2. The subject matter of claim 1 further characterized by having a spring for yieldably restraining such vertical movement of said fulcruming means, and means associated with said spring for adjustably establishing the rate thereof without changing the position of said fulcruming means.

3. The subject matter of claim 2 including means on said case and engageable with said spring for adjustably establishing the effective length thereof.

4. The subject matter of claim 3 further characterized in that said spring is disc-like in shape and has a flexible load member anchored at one end to said case and at the opposite end to said fulcrum positioning means, and in that said adjustment means engages said load member at a point along its length and holds it at that point against flexing relative to said case.

5. The subject matter of claim 1 in which said fulcrum positioning means includes a fulcrum support means in supporting contact with said fulcruming means and having an elongated straight guide edge lying generally parallel and proximal to said flapper, and in which said fulcruming means comprises a portion of an idler crank which is mounted on said carriage, said crank being swingable about an axis perpendicular to said guide edge and spaced from the point at which said portion fulcrums said flapper.

6. The subject matter of claim 1 in which a plurality of indexing marks are fixedly mounted on said case, and having a pointer on said carriage adapted to be registered with respective ones of said marks as said carriage is moved laterally toward and away from said nozzle.

References Cited by the Examiner

UNITED STATES PATENTS

| | | | |
|---|---|---|---|
| 2,568,226 | 9/1951 | Drake | 92—40 |
| 2,661,412 | 12/1953 | Dreyfus | 267—1 X |
| 2,805,682 | 9/1957 | Panich | 92—40 |
| 2,842,148 | 7/1958 | Jones | 137—85 |
| 2,912,993 | 11/1959 | Jones | 137—85 |
| 3,095,002 | 6/1963 | Healy | 137—85 |
| 3,095,891 | 7/1963 | Clements | 137—85 |

MARTIN P. SCHWADRON, *Primary Examiner.*

LAVERNE D. GEIGER, ISADOR WEIL, WILLIAM F. O'DEA, *Examiners.*

E. REICHERT, A. COHAN, *Assistant Examiners.*